(12) United States Patent
Libotte

(10) Patent No.: US 9,248,630 B2
(45) Date of Patent: Feb. 2, 2016

(54) LAMINATE COMPRISING A POLYOLEFIN LAYER ADHERED TO A BASE LAYER

(75) Inventor: Annick Libotte, Nivelles (BE)

(73) Assignee: INEOS EUROPE AG, Rolle (CH)

( * ) Notice: Subject to any disclaimer, the term of this patent is extended or adjusted under 35 U.S.C. 154(b) by 198 days.

(21) Appl. No.: 14/009,657

(22) PCT Filed: Apr. 3, 2012

(86) PCT No.: PCT/EP2012/056046
§ 371 (c)(1),
(2), (4) Date: Oct. 3, 2013

(87) PCT Pub. No.: WO2012/136644
PCT Pub. Date: Oct. 11, 2012

(65) Prior Publication Data
US 2014/0037946 A1  Feb. 6, 2014

(30) Foreign Application Priority Data
Apr. 8, 2011 (EP) .................................. 11161738

(51) Int. Cl.
*B32B 27/08* (2006.01)
*B32B 27/32* (2006.01)
*C08J 5/18* (2006.01)
*B32B 15/085* (2006.01)

(52) U.S. Cl.
CPC ............... *B32B 27/08* (2013.01); *B32B 15/085* (2013.01); *B32B 27/32* (2013.01); *B32B 27/327* (2013.01); *C08J 5/18* (2013.01); *B32B 2250/03* (2013.01); *B32B 2255/10* (2013.01); *B32B 2255/205* (2013.01); *B32B 2307/518* (2013.01); *B32B 2307/72* (2013.01); *B32B 2307/7244* (2013.01); *B32B 2307/7246* (2013.01); *B32B 2439/70* (2013.01); *Y10T 428/265* (2015.01); *Y10T 428/31913* (2015.04); *Y10T 428/31917* (2015.04)

(58) Field of Classification Search
None
See application file for complete search history.

(56) References Cited

U.S. PATENT DOCUMENTS

| 2008/0131672 A1 | 6/2008 | Sang et al. | |
| 2009/0087648 A1* | 4/2009 | Lee | 428/336 |
| 2012/0263960 A1* | 10/2012 | Song et al. | 428/461 |

FOREIGN PATENT DOCUMENTS

| GB | 2 125 802 A | 3/1984 |
| JP | 2-297435 A | 12/1990 |

* cited by examiner

*Primary Examiner* — Sheeba Ahmed
(74) *Attorney, Agent, or Firm* — Nixon & Vanderhye P.C.

(57) ABSTRACT

Laminate containing a polyolefin layer adhered to a base layer. The polyolefin layer contains a blend of 90-99.7 wt % of a copolymer comprising 80-98 wt % of propylene and 2-20 wt % of $C_2$-$C_{10}$ α-olefin units, and 0.3-10 wt % of a polyethylene having a density of 870-920 kg/m$^3$ or less. The base layer includes a propylene homopolymer or a copolymer of propylene and up to 5 wt % of $C_2$-$C_{10}$ alpha-olefin units other than propylene.

14 Claims, 1 Drawing Sheet

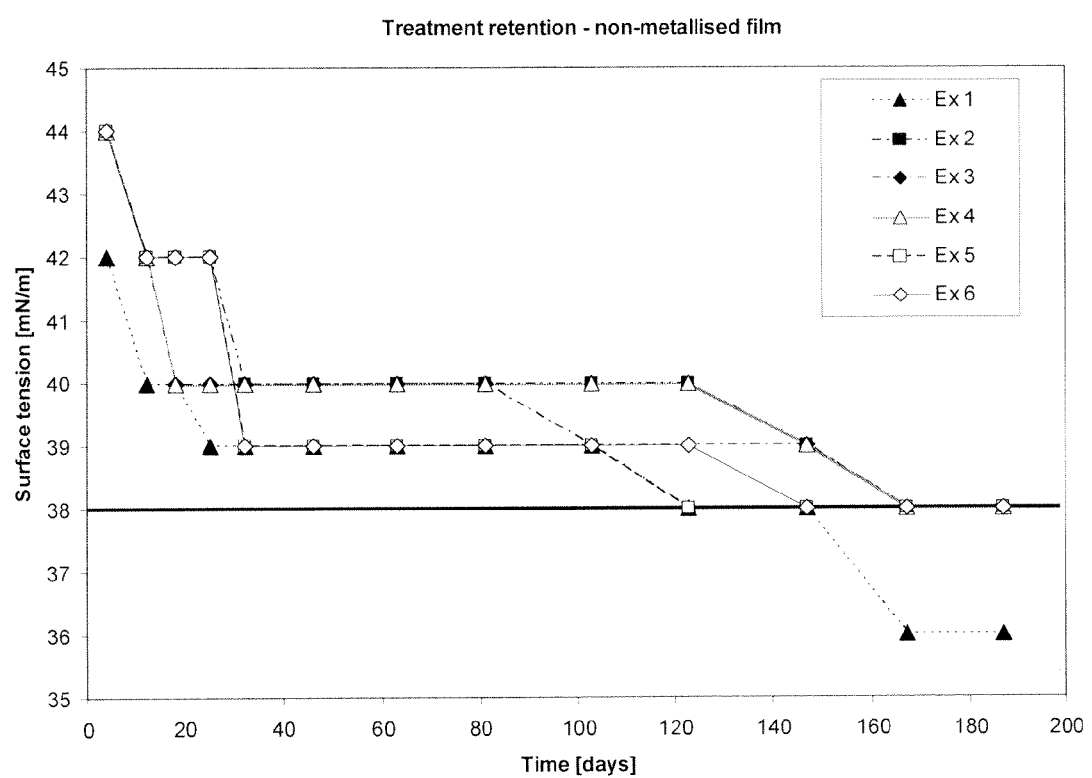

LAMINATE COMPRISING A POLYOLEFIN LAYER ADHERED TO A BASE LAYER

This application is the U.S. national phase of International Application No. PCT/EP2012/056046 filed 3 Apr. 2012 which designated the U.S. and claims priority to European Patent Application No. 11161738.7 filed 8 Apr. 2011, the entire contents of each of which are hereby incorporated by reference.

This invention relates to a polyolefin resin composition suitable for use in films suitable for further processing such as printing, metallisation or lamination, as well as metallised films containing such films. More particularly, it relates to a polyolefin resin composition optionally having deposited upon it a metal layer, which has good resistance to damage and "wrinkles" caused during processing.

BACKGROUND OF THE INVENTION

In recent years, crystalline propylene-α-olefin copolymers, composed mainly of propylene and typically also containing ethylene and/or 1-butene as comonomer, have been widely used for film applications on account of their characteristics of good transparency, excellent impact properties and good heat-sealability, etc. Metallised films obtained by depositing metals onto plastic films in vacuo have been widely used for many years eg for packaging films, with the substrate onto which the metal is deposited often being the aforementioned propylene-α-olefin copolymers. In particular, single layer cast films or biaxially oriented polypropylene (BOPP) films, either single or multilayered, which have a metal coating deposited on the surface, are commonly used for food packaging. Such single layer cast films BOPP films can also be used in similar non-metallised applications.

One problem with propylene-α-olefin copolymers used in such applications is their low flexibility and also their stickiness at relatively high temperature and particularly at high processing speeds. This can cause problems during processing, which is carried out at high temperature and involves stretching of the film followed by metallisation. Adhesion of the propylene polymer to the rollers in the processing line can cause wrinkles and protuberences to appear on the film during the stretching process. This can result in films of poor optical quality and appearance, particularly after metallisation. Such problems are typically addressed by the addition to the propylene-α-olefin copolymers of slip agents, which reduce the risk of the polymer sticking to the rollers. Examples of such slip agents include fatty acid amides or waxes. However the use of such compounds provides its own set of problems. For example they can cause a reduction in surface tension of the film which makes printing or adhesion onto a metallized surface much more difficult. Use of some waxes can also impart poor organoleptic properties to the film.

JP 2297435A discloses a metallised film in which the metal is deposited on a layer comprising 18-60 wt % of a straight chain polyethylene having a density of 925-937 kg/m³ and 40-82 wt % of a polypropylene. This is said to improve adhesion of the metal film.

GB 2125802A attempts to overcome the disadvantages associated with known slip agents by providing a blend of 80-96 wt % of a crystalline propylene-α-olefin copolymer containing 70% by weight or more of propylene and 4-20 wt % of a high density polyethylene having a density of 940 kg/m³ or more. GB 2125802A states that if the density of the high density polyethylene is below 940 kg/m³, it is impossible to obtain metallised films having a good "taken-up figure", that is to say a film having a surface free of surface defects such as wrinkles or protuberences.

SUMMARY OF THE INVENTION

We have found that a good balance of metal film adhesion, film quality and organoleptic properties can be obtained by employing in the composition a polyethylene having a density below 940 kg/m³. Accordingly in a first aspect the present invention provides a laminate comprising a polyolefin layer which comprises a blend of 90-99.7 wt % of a copolymer of propylene and at least one α-olefin and 0.3-10 wt % of a polyethylene having a density of 940 kg/m³ or less, adhered to a base layer comprising a propylene homopolymer or a copolymer of propylene and up to 5 wt % of $C_2$-$C_{10}$ alpha-olefin units other than propylene.

The word "laminate" in this specification is intended to mean a film which contains two or more different layers.

The propylene-α-olefin copolymer of the polyolefin layer is preferably a copolymer comprising 80-98 wt % of propylene and 2-20 wt % of units of at least one $C_2$-$C_{10}$ α-olefin. Preferred α-olefins are ethylene, 1-butene, 1-pentene, 1-hexene, 1-heptene, 1-octene and 4-methyl-1-pentene. The copolymer may optionally contain units of more than one α-olefin. The most preferred copolymers are those of propylene with either ethylene or 1-butene, or both ethylene and 1-butene.

Most preferably the polyolefin layer comprises a copolymer of propylene and either 2-8 wt % of ethylene or 4-10 wt % of 1-butene. Particularly preferred compositions are a copolymer of propylene and 3-5 wt % of ethylene or a copolymer of propylene and 5-8 wt % of 1-butene. Alternatively the compositions may be terpolymers, containing 4-15 wt % of 1-butene and also 0.3-3 wt % ethylene, with preferred amounts of comonomer being 10-14 wt % 1-butene and 0.5-2 wt % ethylene.

The polyethylene preferably has a melt index $MI_2$ measured according to ISO Standard 1133 (190° C., 2.16 kg) of 2-30 g/10 min, preferably 3-20 g/10 min.

The polyethylene preferably has a density of 860-940 kg/m³, preferably 870-920 kg/m³.

It is preferred that the polyethylene has a molecular weight distribution (Mw/Mn) of 2-4. Molecular weight distribution is measured by GPC. It is also preferred that the polyethylene is made using a single site catalyst, particularly a metallocene catalyst.

The base layer can comprise any olefin polymer conventionally used as base layer for multilayer propylene polymer films. Preferably, it comprises propylene homo- or copolymers containing up to 5 wt % of $C_2$-$C_{10}$ alpha-olefin units other than propylene. In both aspects of the invention, particularly preferred alpha-olefins are ethylene, 1-butene, 1-pentene, 1-hexene, 1-heptene, 1-octene and 4-methyl-1-pentene, more particularly ethylene and 1-butene.

The propylene copolymer of the polyolefin layer may also contain one or more additives normally used in the art, such as stabilizers, antiblocking agents, acid scavengers, fillers, nucleating agents, normally in an amount up to 5 wt %, preferably up to 2 wt %. In general, these are incorporated during granulation of the polymeric product obtained in the polymerisation.

Customary stabilizers include antioxidants such as sterically hindered phenols, sterically hindered amines or LTV stabilizers, processing stabilizers such as phosphites or phosphonites having a molecular weight of 500 or more (to prevent migration to the surface of the polypropylene), and acid scavengers such as hydrotalcite. Antioxidants are preferably added in an amount of no more than 0.3 wt %.

Optionally the polyolefin layer may also contain fillers such as talc, chalk or glass fibers, and/or nucleating agents. Examples of nucleating agents include inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_9$ alkyl-substituted derivatives.

Suitable acid scavengers are for example synthetic hydrotalcite. Preferred antiblocking agents are silica and silicates, zeolites, kaolins and polymethyl methacrylate.

If the polyolefin layer is not adhered to a further layer, its thickness is preferably between 10 and 1000 µm, more preferably 20-100 µm: if the polyolefin layer is adhered to a further layer such as the base layer, its thickness is preferably up to 5 µm, more preferably 0.6-3 µm, particularly preferably from 0.8-1.5 µm.

The propylene homo- and copolymers of the base layer may also contain one or more additives normally used in the art, such as stabilizers, acid scavengers, clarifiers, fillers, nucleating agents, pigments and cavitating agents such as $CaCO_3$, normally in an amount up to 5 wt %, preferably up to 2 wt %. Preferably, the base layer is calcium stearate free.

The thickness of the base layer is preferably up to 100 µm, more preferably from 5-60 µm, particularly preferably from 8-40 µm.

The laminate of the invention may optionally have a metal layer deposited on the opposite surface of the polyolefin layer from the base layer. The metal layer may comprise titanium, vanadium, chromium, manganese, iron, cobalt, nickel, copper, zinc, aluminium, gold, palladium, silicon oxide $SiO_x$ or mixtures thereof. An aluminium metal layer is preferred. The optical density of the metallised film preferably ranges from 0.5 to 4.0.

Both the propylene/α-olefin copolymer and the polyethylene of the polyolefin layer, and the propylene homo- or copolymer of the base layer can be prepared by various known methods. The polymerisation process can be carried out in gas phase and/or in liquid phase, in continuous or batch reactors, such as fluidized bed or slurry reactors, or alternatively the gas-phase polymerization process can carried out in at least two interconnected polymerization zones. The reaction time, temperature and pressure of the polymerization steps are not critical per se, however the temperature ranges usually from 50° C. to 120° C. The polymerization pressure preferably ranges from 0.5 to 25 MPa if the polymerization is carried out in gas-phase. The catalytic system can be pre-contacted (pre-polymerised) with small amounts of olefins. The molecular weight of the propylene copolymers ca be conveniently regulated by using known regulators, such as hydrogen. The density of the polyethylene can be conveniently regulated by addition of $C_4$-$C_{10}$ α-olefins such as 1-butene, 1-pentene, 1-hexene, 1-heptene, 1-octene and 4-methyl-1-pentene.

The polymerisation of the propylene/α-olefin copolymer of the polyolefin layer and the propylene homo- or copolymer of the base layer can be carried out in presence of a highly stereospecific heterogeneous Ziegler-Natta catalyst. Suitable Ziegler-Natta catalysts comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Alternatively, metallocene catalysts may be used.

Polyethylenes having a density below 940 kg/m³, typically referred to as linear low density polyethylenes (LLDPE), are very well known and widely available. They may be made by any conventional method, typically using Ziegler-Natta, chromium or metallocene catalysts. It has been found that such polyethylenes made with single site catalysts, particularly metallocene catalysts, are especially suitable for use in the present invention.

The single site polymerisation catalyst may typically be a transition metal complex of Groups 3 to 12 of the Periodic Table of Elements (IUPAC Version). Examples of such complexes are well known in the art.

There have been developed several different families of metallocene complexes. In earlier years catalysts based on bis(cyclopentadienyl) metal complexes were developed, examples of which may be found in EP 129368A or EP 206794A. More recently complexes having a single or mono cyclopentadienyl ring have been developed. Such complexes have been referred to as 'constrained geometry' complexes and examples of these complexes may be found in EP 416815A or EP 420436A. In both of these complexes the metal atom eg. zirconium is in the highest oxidation state.

Other complexes however have been developed in which the metal atom may be in a reduced oxidation state. Examples of both the bis(cyclopentadienyl) and mono (cyclopentadienyl) complexes have been described in WO 96/04290 and WO 95/00526 respectively.

The above metallocene complexes are utilised for polymerization in the presence of a cocatalyst or activator. Typically activators are aluminoxanes, in particular methyl aluminoxane or alternatively may be compounds based on boron compounds.

Examples of the latter are borates such as trialkyl-substituted ammonium tetraphenyl- or tetrafluorophenyl-borates or triarylboranes such as tris(pentafluorophenyl) borane. Catalyst systems incorporating borate activators are described in EP 561479A, EP 418044A and EP 551277A.

More recently other single site catalyst systems have been developed. For example based on metal complexes comprising late transition metals such as iron, cobalt and nickel.

Examples of such compounds are described in WO 98/27124, WO 99/12981, EP 1015501A and EP 1276777A and may be illustrated by [2,6-diacetylpyridinebis(2,6-diisopropylanil)$FeCl_2$], 2,6-diacetylpyridinebis (2,4,6-trimethylanil) $FeCl_2$ and [2,6-diacetylpyridinebis(2,6-diisopropylanil) $CoCl_2$].

Chem Rev 2003, 103, 283-315, Chem Rev 2000, 100, 1169-1203 and Angew Chem Int Ed 1999, 38, 428-447 provide further details of suitable metallocene complexes and other single site catalysts.

Other catalysts include derivatives of Groups 3-4 or Lanthanide metals which are in the +2, +3 or +4 formal oxidation state. Preferred compounds include metal complexes containing from 1 to 3 anionic or neutral ligand groups which may be cyclic or non-cyclic delocalized π-bonded anionic ligand groups. Examples of such π-bonded anionic ligand groups are conjugated or non-conjugated, cyclic or non-cyclic dienyl groups, allyl groups, boratabenzene groups, phosphole and arene groups. By the term π-bonded is meant that the ligand group is bonded to the metal by a sharing of electrons from a partially delocalised π-bond.

Each atom in the delocalized π-bonded group may independently be substituted with a radical selected from the group consisting of hydrogen, halogen, hydrocarbyl, halohydrocarbyl, hydrocarbyl, substituted metalloid radicals wherein the metalloid is selected from Group 14 of the Periodic Table. Included in the term "hydrocarbyl" are C1-C20 straight, branched and cyclic alkyl radicals, C6-C20 aromatic radicals, etc. In addition two or more such radicals may together form a fused ring system or they may form a metallocycle with the metal.

Examples of suitable anionic, delocalised π-bonded groups include cyclopentadienyl, indenyl, fluorenyl, tetrahydroindenyl, tetrahydrofluorenyl, octahydrofluorenyl, etc. as well as phospholes and boratabenzene groups.

Phospholes are anionic ligands that are phosphorus containing analogues to the cyclopentadienyl groups. They are known in the art and described in WO 98/50392.

The boratabenzenes are anionic ligands that are boron containing analogues to benzene. They are known in the art and are described in Organometallics, 14, 1, 471-480 (1995).

The preferred polymerisation catalysts of the present invention comprise bulky ligand compounds also referred to as metallocene complexes containing at least one of the aforementioned delocalized π-bonded group, in particular cyclopentadienyl ligands. Such metallocene complexes are those based on Group IVA metals for example titanium, zirconium and hafnium.

Metallocene complexes may be represented by the general formula:

$$L_xMQ_n$$

where L is a cyclopentadienyl ligand, M is a Group 4 metal, Q is a leaving group and x and n are dependent upon the oxidation state of the metal.

Typically the Group 4 metal is titanium, zirconium or hafnium, x is either 1 or 2 and typical leaving groups include halogen or hydrocarbyl. The cyclopentadienyl ligands may be substituted for example by alkyl or alkenyl groups or may comprise a fused ring system such as indenyl or fluorenyl.

Examples of suitable metallocene complexes are disclosed in EP 129368 and EP 206794. Such complexes may be unbridged eg. bis(cyclopentadienyl) zirconium dichloride, bis(pentamethyl)cyclopentadienyl dichloride, or may be bridged eg. ethylene bis(indenyl) zirconium dichloride or dimethylsilyl(indenyl) zirconium dichloride.

Other suitable bis(cyclopentadienyl) metallocene complexes are those bis(cyclopentadienyl) diene complexes described in WO 96/04290. Examples of such complexes are bis(cyclopentadienyl) zirconium (2,3-dimethyl-1,3-butadiene) and ethylene bis(indenyl) zirconium 1,4-diphenyl butadiene.

Examples of monocyclopentadienyl or substituted monocyclopentadienyl complexes suitable for use in the present invention are described in EP 416815, EP 418044, EP 420436 and EP 551277. Suitable complexes may be represented by the general formula:

$$CpMX_n$$

wherein Cp is a single cyclopentadienyl or substituted cyclopentadienyl group optionally covalently bonded to M through a substituent, M is a Group 4 metal bound in a $\eta^5$ bonding mode to the cyclopentadienyl or substituted cyclopentadienyl group. X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Particularly preferred monocyclopentadienyl complexes have the formula:

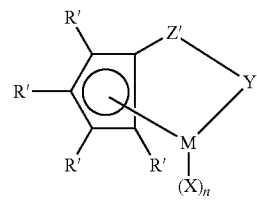

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, or a neutral $\eta^4$ bonded diene group having up to 30 non-hydrogen atoms, which forms a π-complex with M;

Y is —O—, —S—, —NR*—, —PR*—,

M is hafnium, titanium or zirconium,

Z* is SiR*$_2$, CR*$_2$, SiR*$_2$SiR*$_2$, CR*$_2$CR*$_2$, CR*=CR*, CR*$_2$SiR*$_2$, or GeR*$_2$, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido)dimethyl (tetramethyl-$\eta^5$-cyclopentadienyl)silanetitanium dichloride-(2-methoxyphenylamido) dimethyl(tetramethyl-$\eta^5$ cyclopentadienyl)silanetitanium dichloride, (tert-butylamido) dimethylsil(tetramethyl-$\eta^5$-cyclopentadienyl)silanetitanium-$\eta^4$-1,4-diphenyl-1,3-butadiene and (tert-butylamido)dimethyl(tetramethyl-$\eta^5$-cyclopentadienyl)silanetitanium-$\eta^4$-1,3-pentadiene.

Other suitable monocyclopentadienyl complexes are those comprising phosphinimine ligands described in WO 99/40125, WO 00/05237, WO 00/05238 and WO00/32653. A typical examples of such a complex is cyclopentadienyl titanium [tri (tertiary butyl) phosphinimine]dichloride.

The laminate of the invention can be prepared by any process conventionally used in the art for producing polypropylene coextruded films. It is preferred that in a first step (i) the base layer and the polyolefin layer are coextruded, i.e. simultaneously extruded through a multi-layer or multi-slot die, contacted in the molten state and subsequently permanently bonded by cooling the molten mass. After coextrusion and prior to metallisation (if metallisation is required), the surface of the polyolefin layer to be metallised is treated in a step (ii) to promote the metal adhesion. Suitable surface treatments already known in the art are corona-discharge method, corona-discharge in a controlled atmosphere, flame treatment or vacuum plasma treatment, corona treatment being preferred. After the surface treatment, the metal layer is formed onto the surface of the treated polyolefin layer in a subsequent step (iii) using any known metallizing technique, such as sputtering and vapour-deposition, the vapour-deposition being preferred. Vapour-deposition involves the thermal evaporation and subsequent condensation of a metal onto the polyolefin layer, generally under vacuum conditions.

If metallised, the laminate can undergo a post-converting treatment such as extrusion coating, extrusion lamination or adhesive lamination in a further step (iv) subsequent to the metallisation step (iii). In extrusion coating a further layer is applied onto the metal layer, in which the metal layer is coated with a molten resin and the laminate subsequently cooled. Lamination of the coated metal surface with a further substrate can be accomplished simultaneously (extrusion lamination). Depending on the end use of the metallised laminate, different resins can be used for coating the metallized surface. Suitable coating resins are for example polyethylene having density in the range from 880 to 970 kg/m$^3$, polyethylenes modified with maleic anhydride as well as single- or multi-layer polyethylene or PET films, and also non-plastic substrates. In adhesive lamination, the metallised multilayer film and a further substrate are sandwiched together with a layer of adhesive material between them.

The laminate of the invention is preferably oriented. Orientation can be accomplished using well known processes for the manufacturing of oriented films, such as the double-bubble (or tubular) process, the tenter process (conventional or modified tenter-line) or simultaneous stretching technologies. Preferably it is biaxially oriented by the tenter process, sequentially stretching the film in the machine direction (MD) and in the direction across the machine axis (transverse direction, TD). The MD and TD stretching can be equal (balanced orientation) or different; the stretching ratios are preferably 2 to 10, more preferably 3 to 7 in MD and from 5 to 15, more preferably from 6 to 12, particularly preferably from 8 to 10 in TD. Orientation preferably occurs before metallisation.

The laminate of the invention may optionally comprise at least one further layer adhered to the surface of the base layer opposite that to which the polyolefin layer is adhered. Depending on the end use of the resulting laminate, the further layer(s) may comprise at least one olefin polymer selected among:
(i) isotactic or mainly isotactic propylene homopolymers and homo- or copolymers of ethylene, such as HDPE, LDPE and LLDPE;
(ii) copolymers of propylene with ethylene and/or alpha-olefins having 4 to 10 carbon atoms, such as 1-butene, 1-hexene, 4-methyl-1-pentene, 1-octene, wherein the total comonomer content ranges from 0.05 to 40 wt % with respect to the weight of the copolymer, or mixtures of said copolymers with isotactic or mainly isotactic propylene homopolymers;
(iii) elastomeric copolymers of ethylene with propylene and/or an alpha-olefin having 4 to 10 carbon atoms, optionally containing minor quantities (in particular, from 1 wt % to 10 wt %) of a diene such as butadiene, 1,4-hexadiene, 1,5-hexadiene, ethylidene-1-norbornene;
(iv) heterophasic copolymers comprising (1) a propylene homopolymer and/or one of the copolymers of item (ii), and (2) an elastomeric fraction comprising one or more of the copolymers of item (iii), said heterophasic copolymer generally containing said elastomeric fraction in quantities from 5 to 80 wt % with respect to the weight of the heterophasic copolymer;
(v) 1-butene homopolymers or copolymers with ethylene and/or alpha-olefins having 5 to 10 carbon atoms;
(vi) the same propylene copolymer as utilised in the polyolefin layer, optionally blended with polyethylene;
(vii) mixtures thereof.

The above additional layer may comprise customary additives known to those skilled in the art, such as stabilizers, clarifiers, antiacids, antiblocking agents, non-migrating lubricants such as silicones and silicone oils, fillers, nucleating agents, dyes, or pigments.

Laminates according to the invention which contain the above additional layer(s) are conveniently prepared by coextruding said further layer(s) in the first step (i) described above.

When metallised, the laminates have good barrier properties against the transmission of oxygen and water vapour, and are therefore particularly suitable for food packaging.

EXAMPLES

For the Examples below, a propylene-ethylene copolymer was used which had an ethylene content (as measured by FTIR) of 4.3 wt %, a melt flow rate (2./16 kg, 230° C.) of 5.0 g/10 min, a melting temperature (DSC method ISO 11357-3 (1)) of 134° C., a hexane extractables content (FDA method 177, section 1520, Annex B) of 1.6 wt % and a xylene solubles content (ISO 6427/B:1992) of 10 wt %. This is referred to below as Polymer X.

A 3-layer non-metallised film was made by coextruding three layers as follows:
A—polyolefin layer, 1 µm thick
B—base layer, 20 µm thick
C—polyolefin layer, 1 µm thick Layer A was corona-treated. The basic composition of the treated polyolefin layer A was as follows:
99.8 wt % of Polymer X,
0.03 wt % of DH4TA, a hydrotalcite from Mitsui Kyowa Chemicals (anti-acid)
0.1 wt % of Irganox® 1010, a sterically hindered phenol from Ciba Speciality Chemicals (antioxidant)
0.07 wt % of Irgafos® PEP-Q, an organic phosphonite from Ciba Speciality Chemicals (acid scavenger)

To the above propylene copolymer was added either: a polyethylene wax, Luwax® AM6 from BASF, having a melt viscosity of 1200 mm/s$^2$ and a density of 920 kg/m$^3$, or LLDPE made using a metallocene catalyst, two examples of which were used as detailed in the Table below.

The amounts of wax/LLDPE added to the propylene copolymer are also shown in the Table below.

The base layer B was a propylene homopolymer having a melt flow rate (2./16 kg, 230° C.) of 3.0 g/10 min, and free of additives other than stabilisers and antioxidants.

The untreated polyolefin layer C was:
96 wt % Polymer X, and
4 wt % of Metblock 1, an antiblocking agent from Ampacet.

The film was produced on a tenter biaxially oriented polypropylene pilot line under the following conditions, which were selected with the intention of producing optical defect in the film:
Main extruder temperature (core layer): 250° C.
Satellite extruder temperature (polyolefin layer): 230° C.
3 layer die temperature: 250° C.
Chill roll temperature: 30° C.
Machine direction orientation:
    Temperatures: first drawing roll 112° C., second drawing roll 95° C.
    Stretching ratio: 5.5
Transverse direction orientation:
    Temperature: 165° C.
    Stretching ratio: 8

Corona treater: adjusted to have 42 mN/m and kept at same set point for all rolls Line speed: 40 m/min.

The film was metallised by standard vacuum deposition of aluminium, performed by Metalvuoto (Italy). The metal deposit was adjusted to reach an optical density of 2.2.

Film Evaluation

Processability of the unmetallised film is important because it directly affects the quality and appearance of the final product. It was evaluated by visual observation. The biaxially oriented film was held up to the light immediately after it had exited the transverse direction orientation oven. Levels of haze, cloudiness, scratches and rough surface were observed, with high levels resulting in a poor rating and very low or non-existent levels resulting in a very good rating.

Surface tension of the unmetallised film can be important because if a high level of surface tension is retained, further processing such as printing, metallisation or lamination is easier. A surface tension of at least 38 mN/m is generally regarded as desirable. Therefore it is desirable for the surface tension of the non-metallised film to remain above this level for as long as possible.

The surface tension was evaluated according to ASTM D2578-94. A drop of test ink having a certified surface tension was spread on the surface of the film. The surface tension is considered to be the same as that of a test ink which wets the surface for at least 2 seconds. The test inks employed were Softal® test inks, having surface tensions between 34 and 56 mN/m.

Metal adhesion in the metallised film is important because poor adhesion can result in flaking off of the metal layer during use or further processing. Adhesion was measured by a tape test according to ASTM D3359-95. The metallised film surface was grooved with a cross cut tester having 11 blades at 1 mm spacing (No. 5123 from Byk Gardner). A test tape (Permacel 99) was stuck onto the grooved surface and then pulled off. Metal adhesion was considered to be good if the metal remained on the film surface following removal of the tape.

The results of the above tests are shown in the table below, together with the compositions of the films tested.

Melt index of the polyethylene is measured according to ISO Standard 1133 (190° C., 2.16 kg).

Density of the polyethylene was measured according to ISO 1183-1 (Method A) and the sample plaque was prepared according to ASTM D4703 (Condition C) where it was cooled under pressure at a cooling rate of 15° C./min from 190° C. to 40° C.

Apparent molecular weight distribution and associated averages, uncorrected for long chain branching, were determined by Gel Permeation Chromatography using a Waters 150CV, with 4 Waters HMW 6E columns and a differential refractometer detector. The solvent used was 1,2,4 Trichlorobenzene at 135° C., which is stabilised with BHT, of 0.2 g/liter concentration and filtered with a 0.45 μm Osmonics Inc. silver filter. Polymer solutions of 1.0 g/liter concentration were prepared at 160° C. for one hour with stirring only at the last 30 minutes. The nominal injection volume was set at 400 μm and the nominal flow rate was 1 ml/min.

A relative calibration was constructed using 13 narrow molecular weight linear polystyrene standards:

| PS Standard | Molecular Weight |
|---|---|
| 1 | 7 520 000 |
| 2 | 4 290 000 |
| 3 | 2 630 000 |
| 4 | 1 270 000 |
| 5 | 706 000 |
| 6 | 355 000 |
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, was recorded for each PS standards. The PS molecular weight was then converted to PE equivalent using the following Mark Houwink parameters $k_{ps}=1.21\times 10^{-4}$, $\alpha_{ps}=0.707$, $k_{pe}=3.92\times 10^{-4}$, $\alpha_{pe}=0.725$. The calibration curve $Mw_{PE}=f(V)$ was then fitted with a first order linear equation. All the calculations are done with Millennium 3.2 software from Waters.

The very low molecular weight fractions (below 1000 Daltons) were routinely excluded in the calculation of number average molecular weight, Mn, and hence the polymer polydispersity, Mw/Mn, in order to improve integration at the low end of the molecular weight curve, leading to a better reproducibility and repeatability in the extraction and calculation these parameters.

TABLE 1

| | | EXAMPLE | | | | | |
|---|---|---|---|---|---|---|---|
| | | 1 (comp) | 2 (comp) | 3 | 4 | 5 | 6 |
| Treated face A | Thickness (μm) | 1 | 1 | 1 | 1 | 1 | 1 |
| | Polypropylene | | | Polymer X (copolymer of propylene + 4.3 wt % ethylene) | | | |
| | PE/wax | None | Luwax AM 6 | PF6130 | PF6130 | Exact 8203 | PF1315 |
| | PE density (kg/m³) | — | — | 917 | | 880 | 914 |
| | PE melt index (g/10 min) | — | — | 3.5 | | 3 | 15 |
| | PE MWD | — | — | 3.5 | 3.5 | 2.5 | 2.7 |
| | PE/wax content (wt %) | 0 | 0.5 | 2.0 | 5.0 | 2.0 | 2.0 |

TABLE 1-continued

| | | EXAMPLE | | | | | |
|---|---|---|---|---|---|---|---|
| | | 1 (comp) | 2 (comp) | 3 | 4 | 5 | 6 |
| Base layer B | Type | Propylene homopolymer | | | | | |
| | Thickness (μm) | 20 | 20 | 20 | 20 | 20 | 20 |
| Untreated face C | Polypropylene | Polymer X (copolymer of propylene + 4.3 wt % ethylene) | | | | | |
| | Thickness (μm) | 1 | 1 | 1 | 1 | 1 | 1 |
| Processability rating | | V poor | Poor | Good | Good | Good | V good |
| Metal adhesion rating | | Good | Good | Good | Good | Good | Good |
| Non-metallised film surface tension—value X days after film production (mN/m) | Day 4 | 42 | 44 | 44 | 44 | 44 | 44 |
| | Day 12 | 40 | 42 | 42 | 42 | 42 | 42 |
| | Day 18 | 40 | 42 | 40 | 40 | 42 | 42 |
| | Day 25 | 39 | 42 | 40 | 40 | 42 | 42 |
| | Day 32 | 39 | 40 | 40 | 40 | 39 | 39 |
| | Day 46 | 39 | 40 | 40 | 40 | 39 | 39 |
| | Day 63 | 39 | 40 | 40 | 40 | 39 | 39 |
| | Day 81 | 39 | 40 | 40 | 40 | 39 | 39 |
| | Day 103 | 39 | 40 | 39 | 40 | 39 | 39 |
| | Day 123 | 38 | 40 | 39 | 40 | 38 | 39 |
| | Day 147 | 38 | 39 | 39 | 39 | 38 | 38 |
| | Day 167 | 36 | 38 | 38 | 38 | 38 | 38 |
| | Day 187 | 36 | 38 | 38 | 38 | 38 | 38 |

The processability ratings show that processability was only slightly improved by addition of the wax. Luwax AM 6. However adding a polyethylene resulted in a significant improvement.

The results of the metal adhesion evaluation show that addition of the polyethylene does not adversely affect this property.

BRIEF DESCRIPTION OF THE DRAWINGS

The non-metallised film surface tension data in the table above is shown graphically in FIG. 1. It shows that films having a polyolefin layer containing the polyethylene retain surface tension above 38 mN/m for longer than those with the pure polypropylene polyolefin layer.

The invention claimed is:

1. Laminate comprising a polyolefin layer adhered to a base layer, the polyolefin layer comprising a blend of 90-99.7 wt % of a copolymer comprising 80-98 wt % of propylene and 2-20 wt % of $C_2$-$C_{10}$ α-olefin units, and 0.3-10 wt % of a polyethylene having a density of 870-920 kg/m$^3$ or less, and the base layer comprising a propylene homopolymer or a copolymer of propylene and up to 5 wt % of $C_2$-$C_{10}$ alpha-olefin units other than propylene.

2. Laminate according to claim 1, wherein deposited on the opposite surface of the polyolefin layer from the base layer is a metal layer.

3. Laminate according to claim 1, wherein the polyethylene has a melt index MI$_2$ measured according to ISO Standard 1133 (190° C., 2.16 kg) of 2-30 g/10 min.

4. Laminate according to claim 1, wherein the polyethylene has a melt index MI$_2$ measured according to ISO Standard 1133 (190° C., 2.16 kg) of 3-20 g/10 min.

5. Laminate according to claim 1, wherein the polyethylene has a molecular weight distribution (Mw/Mn) of 2-4.

6. Laminate according to claim 1, wherein the polyethylene is made using a metallocene catalyst.

7. Laminate according claim 1, wherein the propylene-α-olefin copolymer of the polyolefin layer is a copolymer of propylene and ethylene and/or 1-butene.

8. Laminate according to claim 1, wherein the propylene-α-olefin copolymer of the polyolefin layer is a copolymer of propylene and 3-5 wt % of ethylene or a copolymer of propylene and 5-8 wt % of 1-butene.

9. Laminate according to claim 1, wherein the propylene-α-olefin copolymer of the polyolefin layer contains 4-15 wt % of 1-butene and also 0.3-3 wt % ethylene.

10. Laminate according to claim 1, which is oriented by stretching in at least one of machine direction and transverse direction.

11. Laminate according to claim 10, wherein the stretching ratios are 2 to 10 in the machine direction and 5 to 15 in the transverse direction.

12. Laminate according to claim 1, wherein the thickness of the polyolefin layer when adhered to a further layer is 0.6-3 μm.

13. Laminate according to claim 1, which comprises at least one further layer adhered to the surface of the base layer opposite that to which the polyolefin layer is adhered.

14. Laminate according claim 9, wherein the propylene-α-olefin copolymer of the polyolefin layer contains 10-14 wt % 1-butene and 0.5-2 wt % ethylene.

* * * * *